(12) United States Patent
Bell et al.

(10) Patent No.: US 10,803,969 B1
(45) Date of Patent: Oct. 13, 2020

(54) MEMORY AUTHENTICATION

(71) Applicant: Micron Technology, Inc., Boise, ID (US)

(72) Inventors: Debra M. Bell, Boise, ID (US); Shea M. Morrison, Boise, ID (US); Aparna U. Limaye, Boise, ID (US); Diana C. Majerus, Boise, ID (US); Rachael R. Carlson, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/553,842

(22) Filed: Aug. 28, 2019

(51) Int. Cl.
*G11C 11/409* (2006.01)
*G11C 29/02* (2006.01)
*G06F 21/79* (2013.01)
*G06F 12/14* (2006.01)

(52) U.S. Cl.
CPC ........ *G11C 29/027* (2013.01); *G06F 12/1433* (2013.01); *G06F 21/79* (2013.01); *G11C 11/409* (2013.01)

(58) Field of Classification Search
CPC .... G06F 9/4401; G06F 9/4403; G06F 9/4418; G06F 21/79; G06F 2212/602; G06F 2212/6026; G06F 9/44; G06F 12/08; G11C 11/409; G11C 29/846; G11C 7/1045; G11C 7/20
See application file for complete search history.

(56) References Cited

U.S. PATENT DOCUMENTS

| 7,062,652 | B2 | 6/2006 | Hirota et al. | |
| 7,831,838 | B2 | 11/2010 | Marr et al. | |
| 2003/0233559 | A1 | 12/2003 | Asano et al. | |
| 2016/0179704 | A1* | 6/2016 | Berke | G06F 13/24 711/163 |
| 2016/0344709 | A1* | 11/2016 | Sadhasivan | G09C 1/00 |
| 2018/0091315 | A1* | 3/2018 | Singhal | G06F 21/57 |
| 2019/0050347 | A1* | 2/2019 | Bolotov | G06F 21/44 |

* cited by examiner

*Primary Examiner* — Hien N Nguyen
(74) *Attorney, Agent, or Firm* — Brooks, Cameron & Huebsch, PLLC

(57) ABSTRACT

Apparatuses and methods related to authenticating memory. Memory devices can be authenticated utilizing authentication codes. An authentication code can be generated based on information stored in a fuse array of the memory device. The authentication code can be compared to an externally provided authentication code to authenticate the memory device. The memory device may be authenticated to ensure that the memory device is not a security threat.

20 Claims, 6 Drawing Sheets

US 10,803,969 B1

MEMORY AUTHENTICATION

TECHNICAL FIELD

The present disclosure relates generally to memory, and more particularly to apparatuses and methods associated with programming an authentication fuse array for memory.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

DETAILED DESCRIPTION

The present disclosure includes apparatuses and methods related to memory authentication, which may improve security and quality assurance. By way of example, various computing systems include a number of processing resources that are coupled to memory (e.g., a memory system), which is accessed in association with executing a set of instructions (e.g., a program, applications, etc.). Various security concerns surround memory systems. For example, hackers may try to gain access to a memory system in order to obtain sensitive data, alter stored data, cause damage, etc. Security features are often employed by computing systems and/or by memory systems thereof to protect against unauthorized access, for example. Different security features may be employed by different memory systems, and different memory manufacturers may provide different levels of security. For this reason, among others, it can be beneficial to confirm the authenticity of a memory system and/or its constituent memory devices (e.g., DRAM dies).

For example, confirming that memory devices (e.g., DRAM dice) are from a particular manufacturer can provide a level of assurance that the devices have not been replaced with devices from a different manufacturer, which may pose a security threat. Additionally, since memory devices from different manufacturers may employ different security features and may have different quality levels, a customer (e.g., an entity purchasing a memory system from a manufacturer/vendor) may want to ensure the memory devices employed in the memory system are indeed authentic (e.g., from a known/particular manufacturer or vendor).

Figure 1:
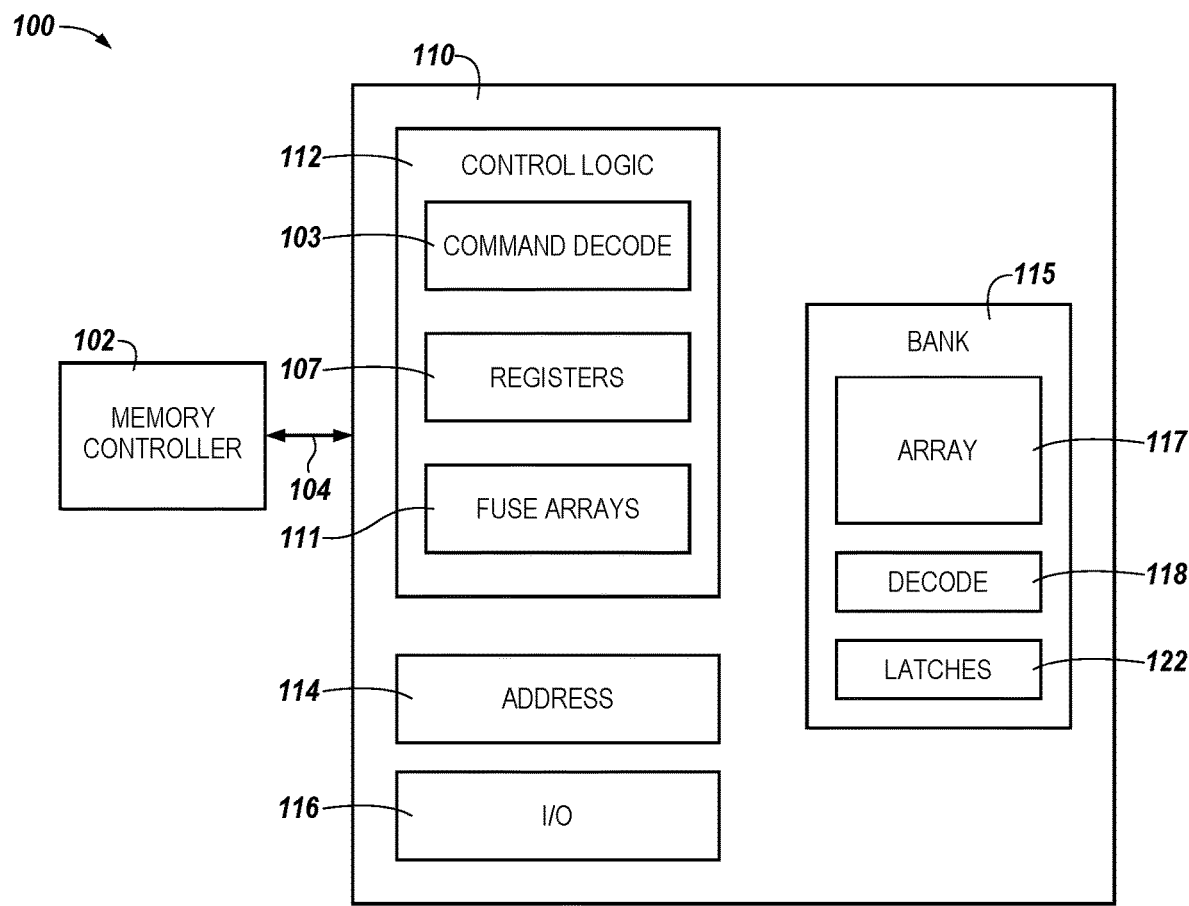
FIG. 1 is a block diagram of an apparatus in the form of a portion of a computing system including a memory device in accordance with a number of embodiments of the present disclosure.

FIG. 1 is a block diagram of an apparatus in the form of a portion of a computing system including a memory device 110 in accordance with a number of embodiments of the present disclosure. In this example, the apparatus is a memory system 100 comprising a memory controller 102 and the memory device 110. As used herein, a memory device 110, a memory bank 115, and/or memory controller 102, for example, might also be separately considered an "apparatus."

In this example, memory system 100 includes a memory controller 102 coupled to a memory device 110 via an interface 104. The memory system 100 can, for example, perform at least read operations and write operations in response to access requests from a host (not shown), which may include a personal laptop computer, a desktop computer, a digital camera, a mobile telephone, a memory card reader, or an Internet-of-Things (IoT) enabled device, among various other types of hosts. The host can access the memory system 100 in association with execution of an operating system (OS) and/or various applications.

The memory device 110 can be, for example, a DRAM device. Although a single memory device 110 is illustrated, embodiments are not so limited. For instance, the memory system 100 can include a plurality of memory devices 110 (e.g., DRAM dies) coupled to the memory controller 102 as part of a memory module such as a dual in-line memory module (DIMM). The memory controller 102 can access the one or more memory devices 110 via interface 104 responsive to host requests. As shown in this example, the memory device 110 includes address circuitry 114 to latch and decode address signals provided over the interface 104. The interface 104 can include, for example, a physical interface employing a suitable protocol (e.g., a data bus, an address bus, and a command bus, or a combined data/address/command bus). The memory device 110 includes input/output (I/O) circuitry 116 associated with transferring data to/from the memory device. The memory device 110 also includes control logic 112. The control logic 112 is configured to decode signals (e.g., commands) from the memory controller 102 (or host), such as chip enable signals, write enable signals, and address latch signals that are used to control operations performed on the memory components 115 (BANK), which can be referred to as memory components 115 or bank 115.

As shown in FIG. 1, the memory components 115 include an array 117 of memory cells, decode circuitry 118, and latches 122. The array 117 can be DRAM arrays, SRAM arrays, STT RAM arrays, PCRAM arrays, TRAM arrays, RRAM arrays, NAND flash arrays, and/or NOR flash arrays, for instance. The array 117 can comprise memory cells arranged in rows coupled by access lines (which may be referred to herein as word lines or select lines) and columns coupled by sense lines (which may be referred to herein as digit lines or data lines).

The decode circuitry 118 can include row and column decode circuitry configured to decode signals from the control logic 112 in association with accessing array 117. As described further below, the latches 122 of the memory banks 115 can latch signals received from the control logic 112. Such signals can include fuse information such as row address information, column address information, and/or configuration information broadcast to the bank 115.

In this example, the control logic 112 includes a command decoder 103, registers 107, and arrays of programmable elements 111 (e.g., fuse arrays). The control logic 112 is responsible for executing commands from the memory controller 102. The control logic 112 can comprise a state machine, a sequencer, and/or some other type of control circuitry, which may be implemented in the form of hardware, firmware, or software, or any combination of the three. In some examples, the memory controller may reside on a host.

The command decoder 103 is configured to decode commands received from memory controller 102. The registers 107 can be, for example, "hidden" (e.g., reserved) multipurpose registers (MPR), which can only be written to internally (e.g., it cannot be written to via a command external to the memory device 110). The registers 107 may also have a limited external read permission such that a particular sequence is required in order to read the contents via a command from a source external to the memory device 110. For example, the registers 107 can be read utilizing a read command and a reserved read address targeting the registers 107. The registers 107 can store an authentication code used to determine the authenticity of the memory device 110. Although the array of programmable elements 111 is described as a fuse array, embodiments are not so limited. For example, the array of programmable elements may include various types of nonvolatile elements such as flash memory cells (e.g., NAND or NOR), phase change memory cells, etc. Additionally, as used herein, a fuse element is intended to include antifuse elements, and a fuse arrays 111 can include a number of fuses and/or a number of antifuses.

Although the examples provided herein are in the context of authentication, the fuse array 111 can be configured to store any type of code. The use of an authentication code is provided as an example and is not intended to limit the type of codes (e.g., information that can be stored by the fuse array 111 and/or the type of codes that can be stored in the registers 107. Accordingly, the codes stored in the fuse array 111 can be used for purposes other than authentication.

As indicated above, a fuse array such as fuse arrays 111 can be used to store various information that can be broadcasted to memory bank 115 in association with operating memory device 110. For example, fuse arrays 111 can include row fuses that can be used to remap defective rows (e.g., rows having defective memory cells) within bank 115 to redundant rows and column fuses that can be used to remap defective columns within bank 115. The fuse array can also include various option fuses that can store, for example, various configuration and/or trimming information. Some of the fuse information may be static, while other fuse information may be variable. For example, in various instances, row address fuse data may be alterable via a post package repair (PPR) operation. A PPR operation refers to an operation used to remap defective memory addresses to redundant addresses after packaging of a memory device (e.g., when the memory device may only be accessible via contacts/pins). However, in various instances, a PPR operation only affects the row fuse data such that the column address fuse data is unaffected by a PPR operation (e.g., the column fuse data remains static).

Figure 2:
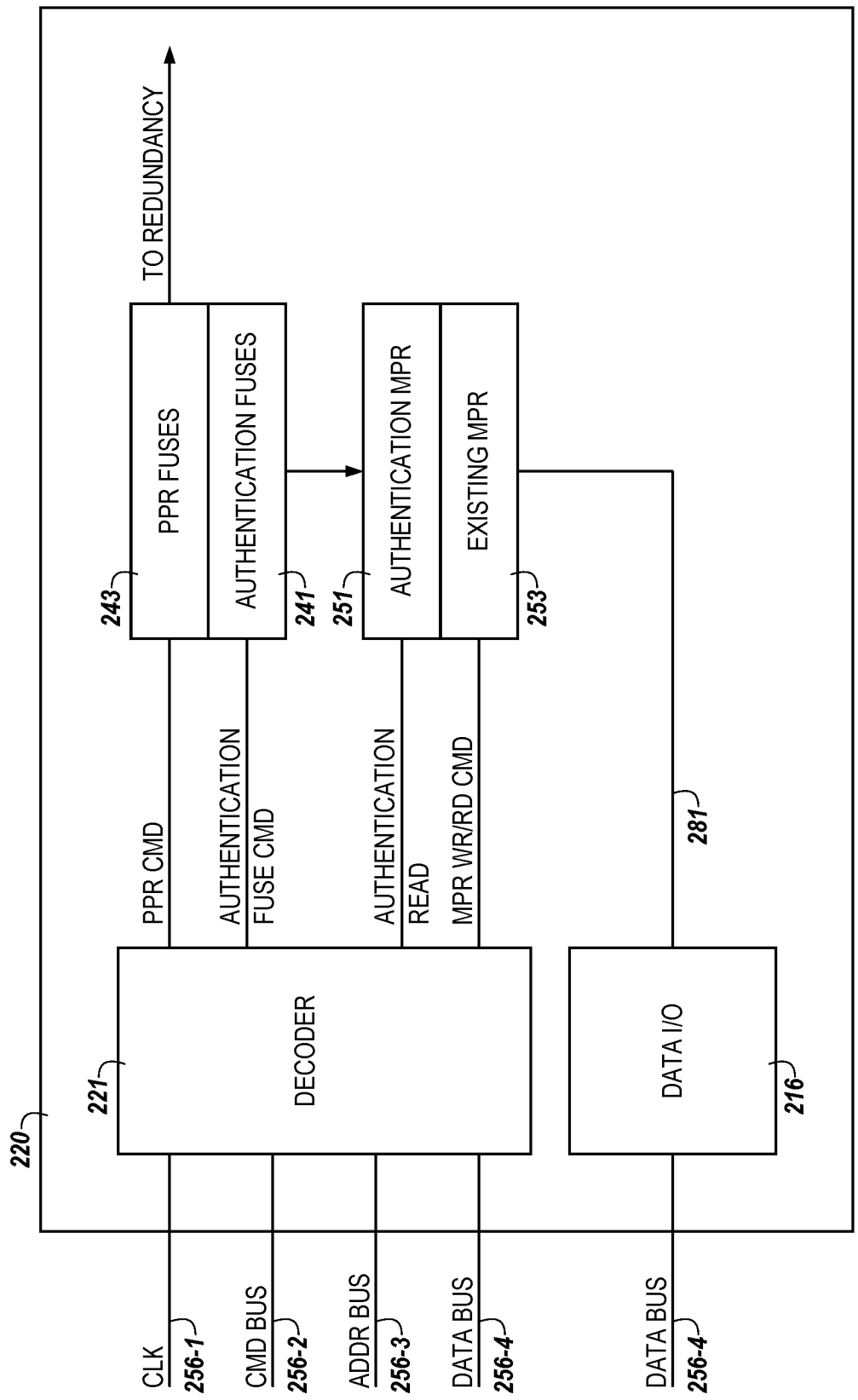
FIG. 2 is a block diagram of an apparatus in the form of a memory device including authentication fuses in accordance with a number of embodiments of the present disclosure.

FIG. 2 is a block diagram of an apparatus in the form of a memory device 220 including authentication fuses 241 in accordance with a number of embodiments of the present disclosure. The memory device 220 can be analogous to the memory device 110 in FIG. 1. The memory device 220 includes portions of a controller such as the control logic 112 in FIG. 1. The memory device 220 can be operated in accordance with a standard that supports PPR operations (e.g., JEDEC DDR4).

The memory device 220 includes the decoder 221, PPR fuses 243, authentication fuses 241, multipurpose registers (MPRs) including authentication MPR 251 and existing MPR 253. The memory device 220 can also include data I/O circuitry 216 which is analogous to the I/O 116 of FIG. 1. The data I/O can couple the authentication MPR 251 and the existing MPR 253 to the data bus 256-4.

The existing MPR 253 describe MPR described in the DDR4 JEDEC, for example. Authentication MPR 251 describes MPR that are utilized to read the authentication fuses 241.

The control circuitry can include a decoder 221 (e.g., command decoder). In various examples, the control circuitry may also include one or more of the PPR fuses 243 and/or the authentication fuses 241. In this example, the interface (e.g., 156 shown in FIG. 1) comprises a clock interface 256-1, a command bus 256-2, address bus 256-3, and a data bus 256-4. The device 220 can receive the authentication activation command and the authentication read command via the command bus 256-2. The device 220 can receive addresses via the address bus 256-1, and data can be provided to/from the device 220 via the data bus 256-4. The data bus 256-4 can provide data from the authentication fuses 241 to a host. The data read from the authentication fuses 241 can be provided to the host to authenticate the memory device 220 via the data bus 256-4.

A host can provide, via the command bus 256-2, the authentication activation command to program the authentication fuses 241. The host can also provide, via the command bus 256-2, an authentication read command to read the authentication fuses 241 via the authentication MPR 251. The memory device 220 can receive the authentication activation command and the authentication read command at the decoder 221. The decoder 221 can decode the authentication activation command and/or the authentication read command.

The authentication activation command can be a mode register set (MRS) command. Responsive to receipt of the authentication activation command, the controller can set the authentication fuses 241. Setting the authentication fuses 241 can include blowing a portion of the authentication fuses 241 and leaving a portion of the fuses 241 in their default state.

An authentication read command can also be received by the memory device 220. An address associated with the authentication read command can also be received by the memory device 220. The address can identify one or more MPRs. For example, the address can identify an authentication MPRs 251. Responsive to determining that the authentication read command is received and that an address associated with the authentication read command correspond to an authentication MPRs 251, the controller can read the authentication fuses 241.

There can be a one-to-one relationship between the authentication MPRs 251 and the authentication fuses 241. Each of the authentication fuses 241 can be associated with a different one of the authentication MPRs 251. Each of the authentication MPRs 251 can be configured to store a bit corresponding to an associated authentication fuse. Storing bits, in the authentication MPRs 251, corresponding to the state of the authentication fuse 241 provides the ability to read the authentication fuse 241 through the authentication MPRs 251. In contrast, the PPR fuses 243 may not be read because there is no circuitry provided to couple the PPR fuses 243 to the data bus 256-4.

The authentication MPRs 251 can be read by moving the data from the authentication MPRs 251 to the data lines (DQs) 281 and from the DQs 281 to the data bus 256-4 via the data I/O 216. The authentication MPRs 251 can provide the data stored in the authentication fuses 241 via a single DQ and/or multiple DQs. For example, data can be moved from the authentication MPRs 251 to a DQ (e.g., DQ–0) such that all of the data is transmitted through the single DQ. The data can also be moved from the authentication MPRs 251 to the DQs such a single instance of the data is transmitted utilizing each of the DQs. The data can further be moved from the authentication MPRs 251 to the DQs such that an instance of the data is transmitted through each of the DQs.

FIG. 2 also shows PPR commands and MPR read and MPR write commands. The PPR commands and MPR read/write commands are shown to differentiate from the authentication activation commands and/or the authentication read commands. While both of the PPR fuses 243 and authentication fuses 241 utilize fuse logic, each of the PPR fuses 243 and the authentication fuses 241 can be programmed using different commands. While both authentication MPRs 251 and existing MPRs 253 are implemented as MPRs, the authentication MPRs 251 and the existing MPRs 253 can be read utilizing different commands.

The existing MPRs 253 can be written utilizing an MPR write command. The authentication MPRs 251 can be written to in association with processing the authentication activation command and/or the authentication read command. For example, the authentication MPRs 251 can be written to responsive to programming the authentication fuse 241. The programming of the authentication fuses 241 can result in setting (e.g., blowing) a portion of the authentication fuses 241 and retaining a default state of a different portion of the authentication fuses 241. After setting the portion of the authentication fuses 241, the data stored in the authentication fuses 241 can be read from the authentication fuses 241 and stored in the authentication MPRs 251.

The authentication MPRs 251 can also be written responsive to processing the authentication read command. For example, each time an authentication read command is received at the memory device 220, the data stored in the authentication fuses 241 can be read and moved to the authentication MPRs 251. In different examples, the data stored in the authentication fuses 241 can be stored in the authentication MPRs 251 a single time and thereafter the data can be read from the authentication MPRs 251 without transferring the data from the authentication fuses 241. Such examples can be utilized in instances where the authentication fuses 241 can only be programmed a single time.

Figure 3:
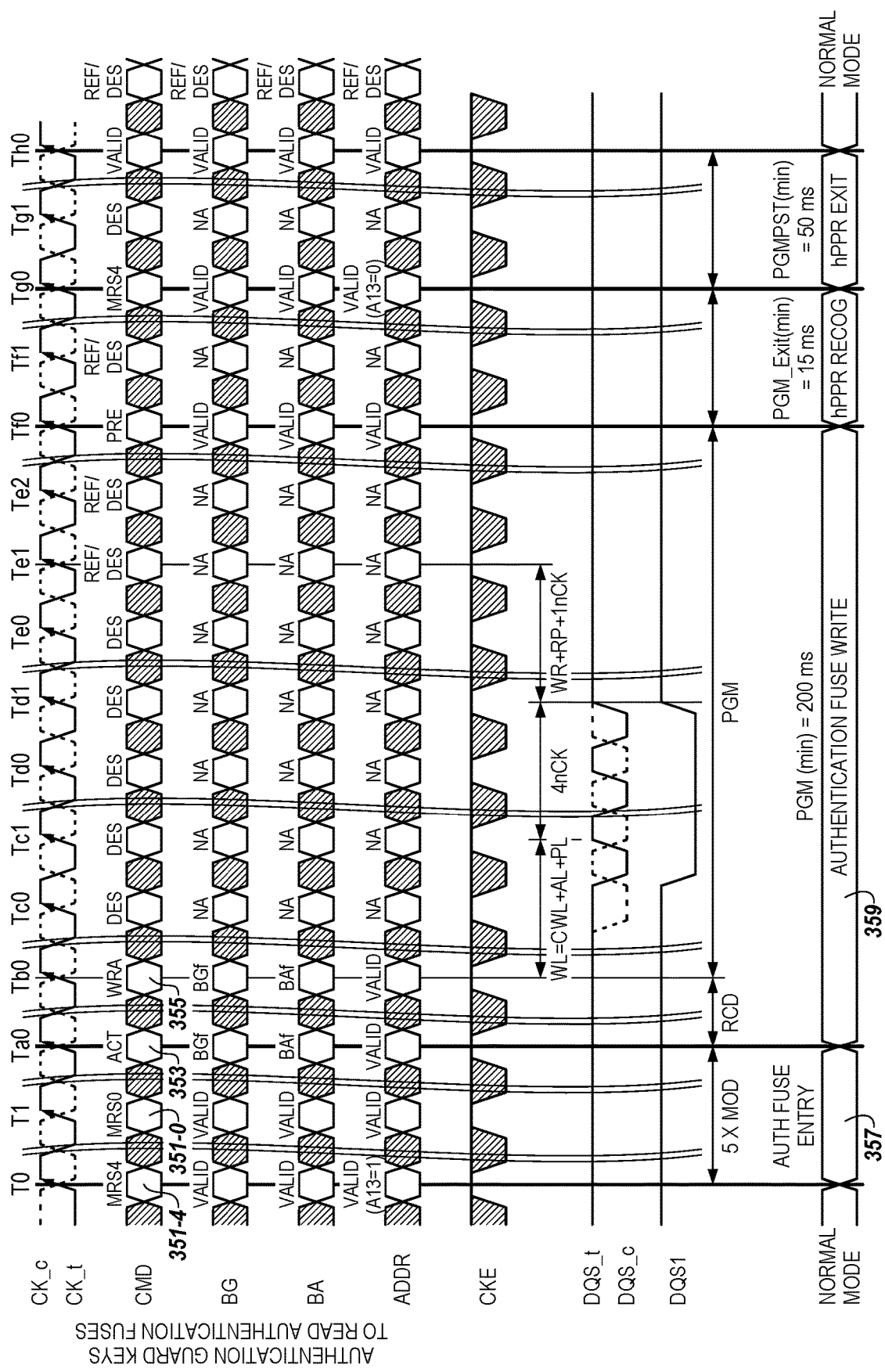
FIG. 3 illustrates an example timing diagram for programming authentication fuses in accordance with a number of embodiments of the present disclosure.

FIG. 3 illustrates an example timing diagram for programming authentication fuses in accordance with a number of embodiments of the present disclosure. FIG. 3 illustrates an authentication fuse entry state 357 and an authentication fuse write state 359 of a memory device processing a received authentication activation command.

In an authentication fuse entry state 357 an authentication activation command can be verified utilizing a command identifier. The command identifier can be provided as a signal or utilizing a plurality of signals. For example, the command identifier can be a plurality of sequential signals. The sequential signals can be comprised of an MR0 command 351-0, an MR1 command 351-1, an MR2 command 351-2, an MR3 command 351-3, and an MR4 command 351-4. Although FIG. 3 shows five MR commands, a different number of commands can constitute a command sequence having the command identifier. For example, the command sequence can be comprised of four MR commands or a different quantity of MR commands. The order of the commands comprising the command sequence can be part of the command sequence. Each of the commands can be in a specific order to constitute the command sequence.

Based on determining that the correct command sequence was provided, the controller can generate and/or process and an activate command and/or a write command. In various instances, the activate command and/or the write command can be part of the authentication fuse entry state 357 and/or the authentication fuse write state 359. The activate command can activate the authentication fuses. The write command can program the authentication fuses by setting a portion of the fuses. A portion of the fuses can be set in the authentication fuses write state 359.

Figure 4:
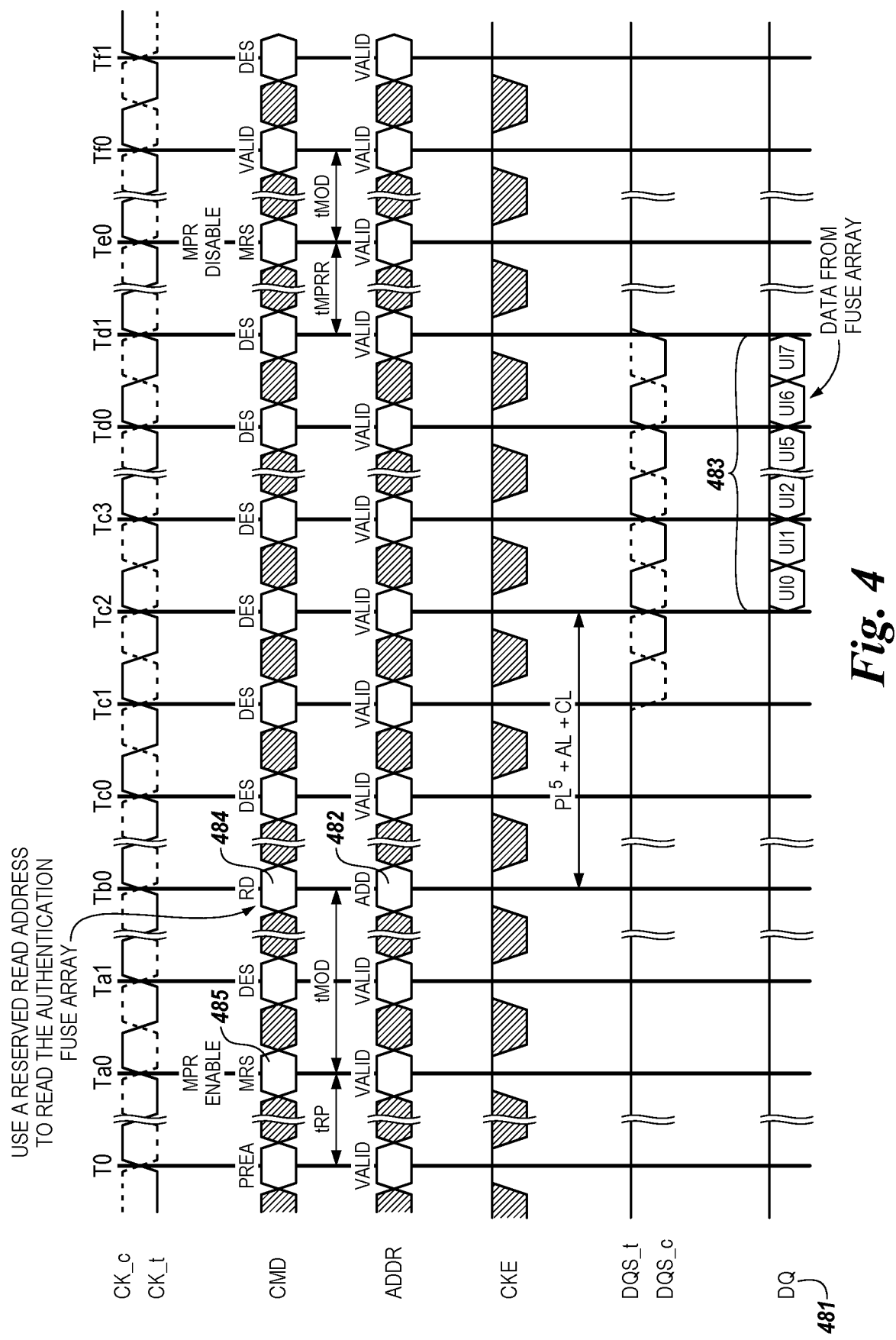
FIG. 4 illustrates an example timing diagram for reading authentication fuses in accordance with a number of embodiments of the present disclosure.

FIG. 4 illustrates an example timing diagram for reading authentication fuses in accordance with a number of embodiments of the present disclosure. The timing diagram shows a read command 484. The read command 484 can be the authentication read command. An address 482 corresponding to the read command 484 can be a reserved read address. The address 482 can be associated with the authentication fuse array and/or the authentication MPRs.

In some examples, the read command 484 can be preceded by an MPR enable mode register set (MRS) command 485. The MPR enable MRS command 485 can enable the read command 484 to be performed without utilizing a unique address corresponding to an MPR or the authentication fuse array.

Responsive to receipt of the read command 484 the data stored in the authentication fuse array can be stored in the authentication MPRs. Responsive to the storing of the data in the authentication MPRs and/or the receipt of the read command 484, the data stored in the authentication MPRs can be provided via a plurality of DQs. 481. The data is shown as UI0, UI1, UI2, UI3, UI4, UI5, UI6, and UI7 are referred to collectively as UI 483.

Figure 5:
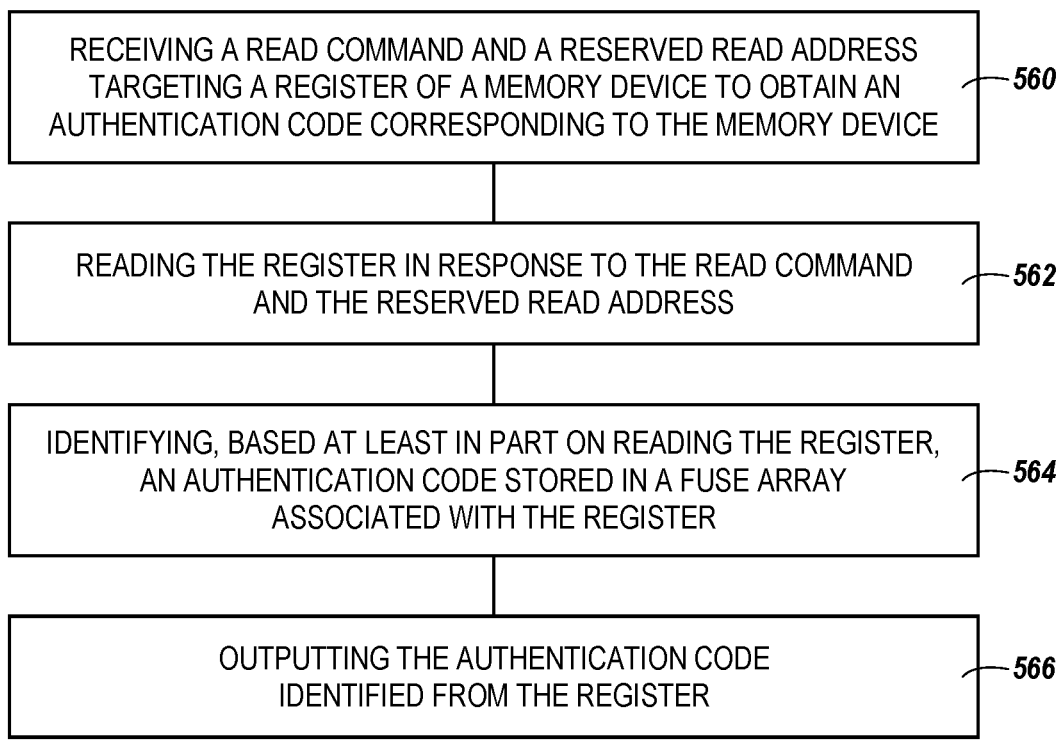
FIG. 5 illustrates an example flow diagram of a method for accessing data stored in authentication fuses in accordance with a number of embodiments of the present disclosure.

FIG. 5 illustrates an example flow diagram of a method for accessing data stored in authentication fuses in accordance with a number of embodiments of the present disclosure. At 560, a command (e.g., an authentication read command) to read the registers (e.g., the registers storing the authentication code) and a reserved read address targeting the register of the memory device can be received by the memory device. At 562, the register can be read to obtain an authentication code corresponding to the memory device. The register can be read responsive to the read command and the reserved read address. The reserved read address can be reserved due to the correspondence of the read address to the authentication MPRs. The authentication MPRs can be differentiated from other MPRs due to the coupling of the authentication MPRs to the authentication fuses and responsive to the storing of data programmed into the authentication fuses by the authentication MPRs.

At 564, an authentication code stored in a fuse array associated with the register can be identified based at least in part on reading the register. As described herein, the register (e.g., authentication register) can store the authentication code stored in the authentication fuse array such the code stored in the fuse array can be read through the registers. For example, the authentication fuses can be coupled to the authentication register (e.g., hard wired) such that the authentication code stored in the fuse array can be transferred to the authentication register. In various examples, the respective states (e.g., set or unset) of the authentication fuses represent the authentication code with the set state representing one logical binary value (e.g., a "1" or "0") and the unset state representing the other logical binary value (e.g., "0" or "1").

At 566, the identified authentication code can be outputted from the register. The data can be provided to a host and/or an entity performing the authentication. For example, the data can be provided to a host internal to a computing device comprising the memory device or a host external to a computing device comprising the memory device. In an example, a plurality of memory devices can be authenticated utilizing a network. A host, through a network, can program a plurality of different authentication fuses corresponding to different memory devices by providing the authentication program commands to the different memory devices. The host can provide authentication read commands to the memory devices to read the authentication codes stored in the different authentication fuses (e.g., from the authentication registers). The data corresponding to the authentication codes can be provided by the respective memory devices through a network to the host.

The command to read and the reserved read address can be provided utilizing a mode register read command that comprises both the read command and the reserved read address. The read command can also be provided as a mode register set command. The mode register read command can be used to access a plurality of bits that are stored in a plurality of latches that comprise the register. Although a register is provided a singular, a register can represent one or more register and/or latches that store one or more bits of data. There can be a one-to-one relationship between the plurality of latches and a plurality of fuses that comprise the fuse array.

The authentication code can be encoded into the fuses by setting fuses of the fuse array as described herein. The setting of the fuses can be permanent such that once set the fuses may not be able to be unset.

The authentication code read from the authentication registers can be compared to an externally provided authentication code. The externally provided authentication code can be provided by a manufacturer and/or a vendor of the memory device. The external authentication code can be provided to a customer. In some examples, the comparison can be performed external to the memory device. In other examples, the comparison is performed internal to the memory device utilizing the external authentication code. The memory device is authentic if the authentication code read from the authentication registers matches the externally provided authentication code. The memory device is not authentic if the authentication code read from the authentication registers does not match the externally provided authentication code. In some examples, a host can perform the comparison.

Performing the comparison internal to the memory device can include receiving the external authentication code from a host. The external authentication code can be received by the memory device. The memory device can compare the external authentication code to the authentication code retrieved from the fuses. The external authentication code can be stored in registers other than the authentication registers and/or the external authentication code can be stored in the authentication registers.

Based on the comparison performed internal to the memory device, the memory device can perform a number of actions. For example, the memory device can refrain from processing additional commands including read or write commands. The memory device can also report the results of the comparison. For example, the memory device can set a flag in a register. A host can refer to the flag to determine whether the memory device is authentic. The host can perform a number of actions based on the value of the flag including refraining from storing data in the memory device, among others.

The memory device can comprise the plurality of authentication fuses and a plurality of PPR fuses. The PPR fuses can be independent from the authentication fuses. The authentication fuses can be independent from the PPR fuses by utilizing different command sequences to program the authentication fuses and program the PPR fuses, by utilizing different fuses for the authentication fuses and the PPR fuses, and/or for utilizing the authentication fuses for different purposes. For example, the PPR fuses are used to repair the memory array while the authentication fuses are used to store data.

In some examples, the processing resource can execute an application which provides the instructions to compare an authentication code read from a register of a memory device to an externally provided authentication code. The application can be used to authenticate the memory device. The application can provide the externally provided authentication code and verify the retrieved authentication code. In some examples, a first application can program the authentication fuses and a different application can read the authentication fuses to authentication a computing device.

Figure 6:
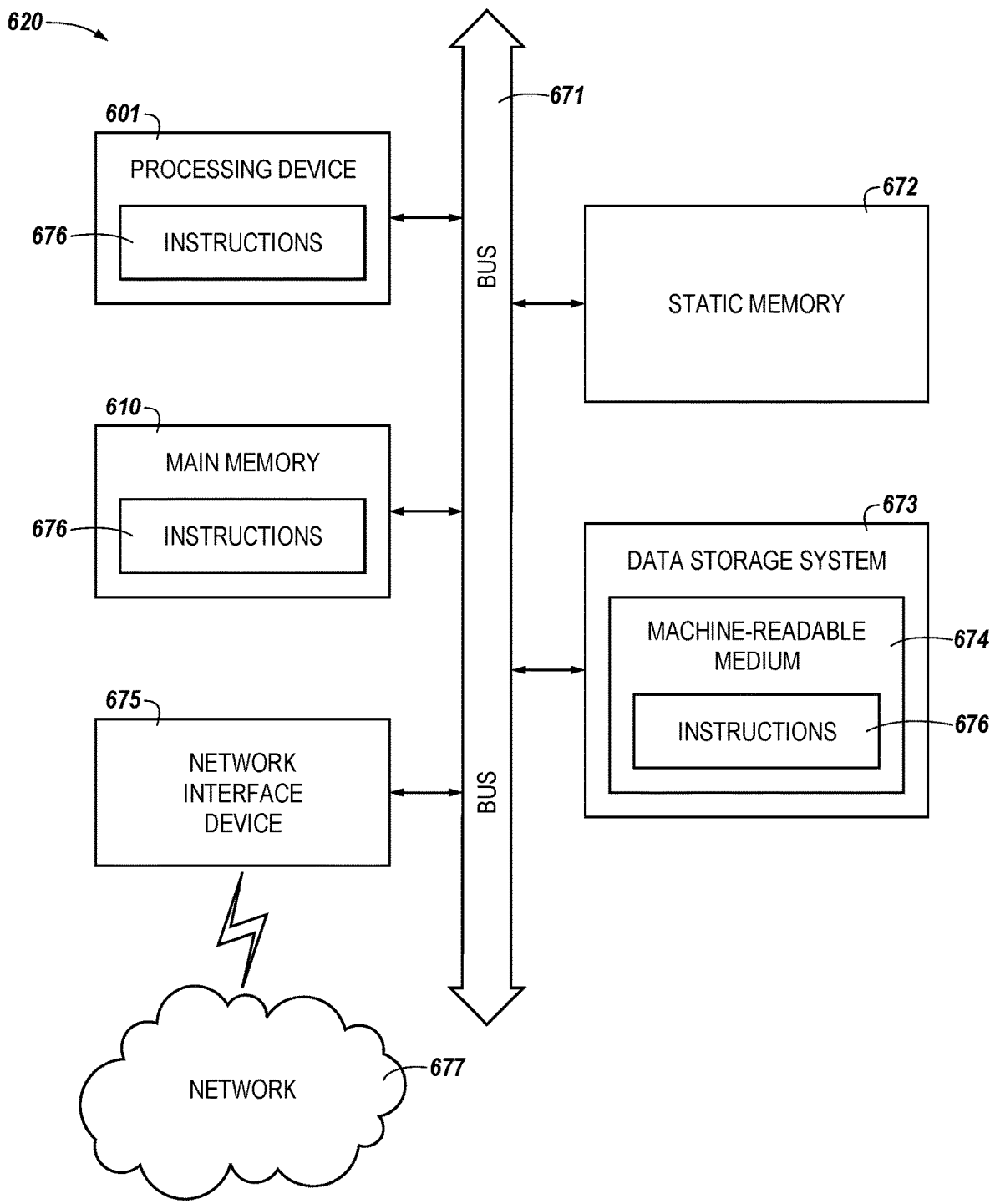
FIG. 6 illustrates an example machine of a computer system within which a set of instructions, for causing the machine to perform various methodologies discussed herein, can be executed.

FIG. 6 illustrates an example computing system 670 within which instructions, to perform various memory authentication methodologies discussed herein, can be executed. In various embodiments, the computing system 670 can correspond to a host system that includes, is coupled to, or utilizes a memory system (e.g., the memory system 100 of FIG. 1). In alternative embodiments, the system 670 can be connected (e.g., networked) to other computing systems in a LAN, an intranet, an extranet, and/or the Internet. The computing system 670 can operate in the capacity of a server or a client machine in client-server network environment, as a peer machine in a peer-to-peer (or distributed) network environment, or as a server or a client machine in a cloud computing infrastructure or environment.

The computing system can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine The example computer system 670 includes a processing device 601, a main memory 610 (e.g., read-only memory (ROM), flash memory, dynamic random access memory (DRAM) such as synchronous DRAM (SDRAM) or Rambus DRAM (RDRAM), etc.), a static memory 672 (e.g., flash memory, static random access memory (SRAM), etc.), and a data storage system 673, which can communicate with each other via a bus 671.

Processing device 601 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 601 can also be one or more special-purpose processing devices such as an application specific integrated circuit (ASIC), a field programmable gate array (FPGA), a digital signal processor (DSP), network processor, or the like. The processing device 601 is configured to execute instructions 676 for performing the operations and steps discussed herein. The computing system 670 can further include a network interface device 675 to communicate over a network 677.

The data storage system 673 can include a machine-readable storage medium 674 (also known as a computer-readable medium) on which is stored one or more sets of instructions 676 or software embodying any one or more of the methodologies or functions described herein. The instructions 676 can also reside, completely or at least partially, within the main memory 610 and/or within the processing device 601 during execution thereof by the system 670, the main memory 610 and the processing device 601 also constituting machine-readable storage media.

In a number of embodiments, the instructions 676 include instructions to implement functionality corresponding to the control logic 112 of FIG. 1. While the machine-readable storage medium 674 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A memory device, comprising:
   a plurality of fuses configured to store a code; and
   control circuitry configured to:
      execute a command to program the code to the plurality of fuses;
      transfer the code from the plurality of fuses to a register;
      identify the code programmed to the plurality of fuses by reading the register responsive to receiving a particular register read command; and
      output the code identified from the register.

2. The memory device of claim 1, wherein the control circuitry is further configured to receive the command to program the code to the plurality of fuses from a first entity subsequent to receipt of the memory device from a second entity.

3. The memory device of claim 2, wherein the first entity comprises one of a memory device manufacturer and a memory device vendor, and wherein the second entity comprises a memory device customer.

4. The memory device of claim 1, wherein the register is a reserved multipurpose register (MPR).

5. The memory device of claim 1, wherein the control circuitry is further configured to receive a mode register set (MRS) command to enable the plurality of fuses to store the code.

6. The memory device of claim 1, wherein the control circuitry is further configured to:
   perform post package repair (PPR) operations by identifying PPR commands based on a particular command identifier; and
   identify the command to program the code to the plurality of fuses based on a different particular command identifier.

7. The memory device of claim 6, wherein the command identifier is independent from the different particular command identifier used for post package repair.

8. The memory device of claim 1, wherein the control circuitry configured to set the portion of the plurality of fuses is further configured to blow the portion of the plurality of fuses.

9. A method comprising:
receiving a read command and a reserved read address targeting a register of a memory device to obtain an authentication code corresponding to the memory device;
reading the register in response to the read command and the reserved read address;
identifying, based at least in part on reading the register, an authentication code stored in a fuse array associated with the register; and
outputting the authentication code identified from the register.

10. The method of claim 9, further comprising a mode register read command that comprises the read command and the reserved read address.

11. The method of claim 9, wherein the register is configured to store a plurality of bits utilizing a plurality of latches and wherein there is a one-to-one relationship between the plurality of latches and a plurality of fuses in the fuse array.

12. The method of claim 9, further comprises encoding the authentication code by setting fuses of the fuse array.

13. The method of claim 9, wherein the fuses are set permanently.

14. The method of claim 9, wherein the read command is a mode register set command.

15. The method of claim 9, further comprises outputting the authentication code to authenticate the memory device to a device external to the memory device.

16. A system, comprising:
a processing resource; and
a memory device coupled to the processing resource and comprising:
a plurality of fuses configured to be programmed with an authentication code corresponding to the memory device; and
a register coupled to the plurality fuses and configured to have the authentication code transferred thereto;
wherein the memory device is configured to, responsive to receiving a command to read the register, output the authentication code read from the register to the processing resource; and
wherein the processing resource is configured to:
compare the authentication code read from the register to an externally provided authentication code;
allow access to a memory array of the memory device responsive to determining that the authentication code read from the register matches the externally provided authentication code; and
prevent access to the memory array of the memory device responsive to determining that the authentication code does not match the externally provided authentication code.

17. The system of claim 16, wherein the memory device comprises the plurality of fuses configured to be programmed with the authentication code and a plurality of post package repair (PPR) fuses.

18. The system of claim 17, wherein the plurality of fuses is independent of the plurality of PPR fuses.

19. The system of claim 16, wherein the memory device is a DRAM.

20. The system of claim 16, wherein the processing resource is further configured to provide the authentication code and compare the authentication code read from the register to the externally provided authentication code.

* * * * *